United States Patent [19]
Cragun et al.

[11] Patent Number: 5,832,212
[45] Date of Patent: Nov. 3, 1998

[54] CENSORING BROWSER METHOD AND APPARATUS FOR INTERNET VIEWING

[75] Inventors: Brian John Cragun; Paul Reuben Day, both of Rochester, Minn.

[73] Assignee: International Business Machines Corporation, Armonk, N.Y.

[21] Appl. No.: 634,949

[22] Filed: Apr. 19, 1996

[51] Int. Cl.$^6$ .................................................. G06F 11/00
[52] U.S. Cl. ........................... 395/188.01; 395/183.22; 395/183.13
[58] Field of Search .............................. 395/186, 188.01, 395/187.01, 609, 607, 606, 605, 602, 326, 329, 334, 337, 338, 183.13, 183.14, 183.22, 604, 608

[56] References Cited

U.S. PATENT DOCUMENTS

| | | | |
|---|---|---|---|
| 4,456,973 | 6/1984 | Carlgren et al. | 364/900 |
| 4,773,039 | 9/1988 | Zamora | 364/900 |
| 5,481,296 | 1/1996 | Cragun et al. | 348/13 |
| 5,530,703 | 6/1996 | Liu et al. | 370/85.13 |
| 5,590,271 | 12/1996 | Klinker | 395/326 |
| 5,606,668 | 2/1997 | Shwed | 395/200.11 |
| 5,608,662 | 3/1997 | Large et al. | 364/724.01 |
| 5,617,565 | 4/1997 | Augenbraun et al. | 395/604 |
| 5,625,781 | 4/1997 | Cline et al. | 395/335 |

OTHER PUBLICATIONS

Snider, "Coding System to Label Content Almost Done", USA Today, Feb. 14, 1996, p. 7D.

Snider, "Net Creating Offer Program to Block Smut", USA Today, Feb. 12, 1996.

Surfwatch, User's Guide, Surfwatch software, Inc. pp. 1–22, 1995.

Rosenfeld et al., "Automated Filtering of Internet Postings", Online, vol. 18,No. 3, pp. 27–30, May 1994.

Andrews, "Visulaizing Cyberspace:Information Visulasation in the Harmony Internet Browser",IEEE, pp. 97–104, 1995.

Pazzani et al., "Learing from Hotlists and Coldlists: Towards A WWW Information Filtering and Seeking Agent", Tools with Artificial Intelligence Int'l Conf.,IEEE, pp. 492–495, 1995.

*Primary Examiner*—Robert W. Beausouel, Jr.
*Assistant Examiner*—Joseph E. Palys
*Attorney, Agent, or Firm*—Joan Pennington

[57] ABSTRACT

A censoring browser method and apparatus are provided for internet viewing. A user profile including user selected censoring parameters is stored. Data packet contents are received and compared with the user selected censoring parameters. Responsive to the comparison, the received data packet contents are processed and selectively displayed responsive to the user selected censoring parameters. The user selected censoring parameters includes user selected censored words and word fragments, and user selected categories. Compared word and word fragments matching user selected censored words and word fragments can be removed and selectively replaced with predefined characters or acceptable substitute words. Tallies of weights for user selected categories are accumulated and compared with used selected threshold values. A predefined message can be displayed responsive to an accumulated tally exceeding a user selected threshold value without displaying the received data packet contents.

20 Claims, 17 Drawing Sheets

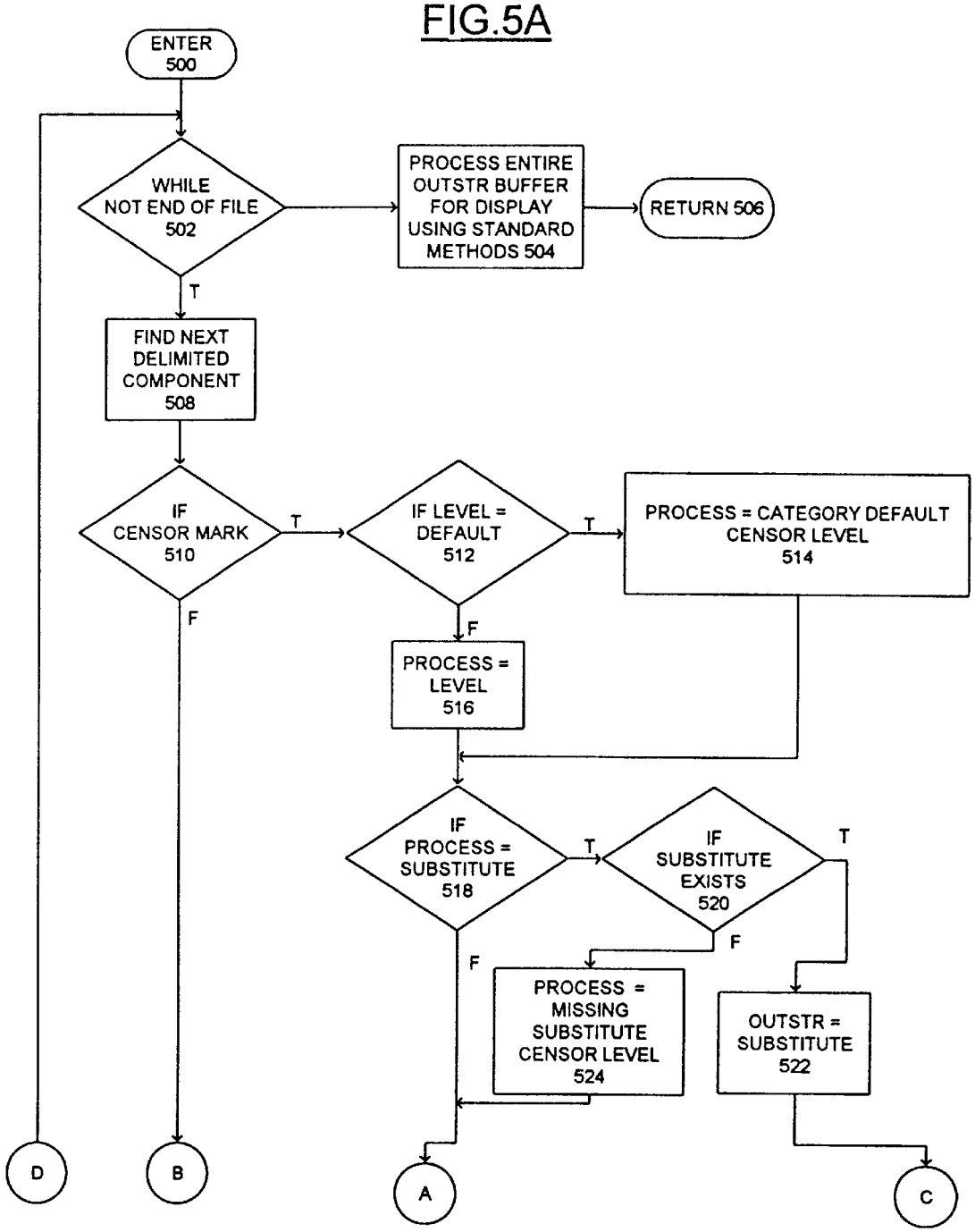

FIG.8A

CATEGORY STRUCTURE 800

| INDEX 804 | SUPER CATAGORY 806 | NAME 808 | BASE WEIGHT 810 | TALLY ONLY WITH CONTEXT 812 | DEFAULT CENSOR LEVEL 814 | CURRENT TALLY 816 | MISSING SUBSTITUTE CENSOR LEVEL 818 |
|---|---|---|---|---|---|---|---|
| 0 | 0 | GENERAL | 30 | 0 | 3 | | |
| 1 | 1 | ANIMAL CONTENT | 5 | 1 | 0 | | |
| 2 | 1 | ANIMAL SLANG | 20 | 0 | 3 | | |
| 3 | 1 | ANIMAL TERMS | 90 | 0 | 5 | | |
| 4 | 2 | FOOD CONTEXT | 5 | 1 | 0 | | |
| 5 | 2 | FOOD SLANG | 20 | 0 | 7 | | 2 |

FIG.8B

SUPER CATEGORY STRUCTURE 802

| INDEX 806 | SUPER CATAGORY 820 | CONTEXT THRESHOLD 822 | LOG THRESHOLD 824 | VIEW THRESHOLD 826 | CONTEXT TALLY 828 | REGULAR TALLY 830 | SUPER TALLY 832 |
|---|---|---|---|---|---|---|---|
| 0 | GENERAL | 80 | 100 | 120 | | | |
| 1 | ANIMAL | 80 | 100 | 120 | | | |
| 2 | FOOD | 80 | 100 | 120 | | | |
| ... | ... | | | | | | |

MANAGE WORD LIST 1400

| WORD OR FRAGMENT 702 | EXACT WORD | CATEGORY 706 | | WEIGHT CHANGE 708 | REPLACEMENT WORD 712 |
|---|---|---|---|---|---|
| BARN | ☐ | ANIMAL IN CONTEXT | → | | |
| CAT | ☒ | ANIMAL OBSCENITY | → | | |
| ELK | ☐ | ANIMAL OBSCENITY | → | 10 | |
| FUR FLY | ☐ | ANIMAL SLANG | → | | |
| MEOW | ☐ | ANIMAL SLANG | → | | |
| YUMMY | ☐ | FOOD SLANG | → | | DELICIOUS |

ADD WORD 1402    DELETE WORD 1404

FIG. 14

MANAGE CATEGORY LIST 1500

| CATEGORY 808 | SUPER CATEGORY 820 | | BASE WEIGHT 810 | REQUIRE CONTEXT 812 | DEFAULT CENSOR LEVEL 814 | | MISSING SUBSTITUTE CENSOR LEVEL 818 | |
|---|---|---|---|---|---|---|---|---|
| GENERAL | GENERAL | → | 30 | ☐ | FIRST LETTER | → | | → |
| ANIMAL IN CONTEXT | ANIMAL | → | 5 | ☒ | NO MARK | → | | → |
| ANIMAL SLANG | ANIMAL | → | 20 | ☐ | FIRST LETTER | → | | → |
| ANIMAL OBSCENITY | ANIMAL | → | 90 | ☐ | 4* | → | | → |
| FOOD IN CONTEXT | FOOD | → | 5 | ☒ | NO MARK | → | | → |
| FOOD SLANG | FOOD | → | 20 | ☐ | SUBSTITUTE | → | SHOW CATEGORY | → |

| ADD CATEGORY 1502 | DELETE CATEGORY 1504 |
|---|---|

FIG.15

MANAGE SUPERCATEGORIES
1600

| SUPER CATEGORY 820 | CONTEXT THRESHOLD 822 | LOG THRESHOLD 824 | VIEW THRESHOLD 826 |
|---|---|---|---|
| GENERAL | 80 | 100 | 120 |
| ANIMAL | 80 | 100 | 120 |
| FOODS | 80 | 100 | 120 |
| RACIAL | 0 | 100 | 120 |
| | | | |

ADD SUPER CATEGORY 1602

DELETE SUPER CATEGORY 1604

FIG. 16

CENSORING BROWSER METHOD AND APPARATUS FOR INTERNET VIEWING

FIELD OF THE INVENTION

The present invention relates to a censoring browser method and apparatus for internet viewing.

DESCRIPTION OF THE PRIOR ART

The internet, an international, wide area network connects thousands of disparate packet-switching networks in industry, education, government, and research. The internet provides a medium for effectively communicating with others and a research support and information retrieval mechanism. The internet is used by people with diverse backgrounds and personalities. Exchange of information is quickly and conveniently provided. However, when searching on topics of interest, located information may contain objectionable and offensive material. Even business areas contain language which is offensive or indecent. Many internet users and parents would like to screen the content of information they regard as offensive.

Effective governmental control or legislation to out-law indecent online content in the global internet environment may be difficult or impossible to implement. A coding system has been proposed by the World Wide Web Consortium to allow parents and other computer users to block content. In this coding system, organizations or interest groups will supply ratings for labeling internet sites. Parents or schools will use browsing software having the ability to recognize rating labels to filter out or block selected sites based on a selected rating system or other criteria, such as age and content. Access could be allowed to sites known to have approved content, and sites where inappropriate content is blocked.

There are several problems with such coding systems and approval lists. Firstly, they depend on other individuals to make the judgment on what is acceptable to the viewer. Social norms vary widely from community to community. Personal tastes and standards vary widely from person to person. What society at large may deem acceptable language, an individual may still find offensive. Secondly, address approval systems must continually be updated with current information. Multiple new sites are being added to the internet daily. A list cannot keep up with all of the changes, or even most of the changes occurring on the internet. To avoid being "black-listed" and traced, some sites are setting up addresses which change on periodic basis. No list of addresses can stay current when addresses are purposely changed. Thirdly, a listing system assumes vast resources because it assumes there is sufficient space to keep a comprehensive list of approved or disapproved sites. The rate of growth of the internet makes such a list unwieldy. Fourthly, a coding system assumes voluntary or legislated compliance by the site owners to be accepted. The internet has clearly demonstrated that there are many individuals who revel in the lack of control and seek to continue to have full freedom to do as they wish. Fifth, address lists and coding schemes depend on blocking content by address, that is by blocking a place so that information is not retrieved or displayed from that site. This means that all information from that site will be blocked. Yet, some sites with valid content have potentially objectionable language. By blocking the site, one misses the valuable content when the real problem is only one portion of the content. Further, unsolicited electronic mail may come from any address, and the originating address can be disguised. In short, it is generally impossible to always gauge content based on site.

A need exists for a censoring browser method and apparatus for internet viewing that efficiently and effectively facilitates user control to selectively censor information to be reviewed. It is desirable to provide such censoring browser method and apparatus that allows user control to set individual censoring standards, that is effective for even the newest sites, and that will work even when the number of sites on the internet grows by orders of magnitude. It is desirable to provide such censoring browser method and apparatus that is not dependent on voluntary or legislated compliance by the site owners, and that is content based as opposed to address based.

SUMMARY OF THE INVENTION

A principal object of the present invention is to provide a censoring browser method and apparatus for internet viewing. Other important objects of the present invention are to provide an improved censoring browser method and apparatus for internet viewing; to provide such improved censoring browser method and apparatus that efficiently and effectively facilitates user control to selectively censor offensive text in information to be reviewed; to provide such improved censoring browser method and apparatus substantially without negative effect; and provide such improved censoring browser method and apparatus that overcome many of the disadvantages of prior art arrangements.

In brief, a censoring browser method and apparatus are provided for internet viewing. A user profile including user selected censoring parameters is stored. Data packet contents are received and compared with the user selected censoring parameters. Responsive to the comparison, the received data packet contents are processed and selectively displayed responsive to the user selected censoring parameters.

In accordance with features of the invention, the user selected censoring parameters includes user selected censored words and word fragments, user selected categories, and user selected super categories. Compared word and word fragments matching user selected censored words and word fragments can be removed and selectively replaced with predefined characters or acceptable substitute words. Tallies of weights for user selected categories are accumulated and compared with user selected threshold values. A predefined message can be displayed responsive to an accumulated tally exceeding a user selected threshold value without displaying the received data packet contents. Transmissions with high tallies can be logged and reviewed at a later time for purposes of audit or refining the words, categories and other selected profile values.

BRIEF DESCRIPTION OF THE DRAWINGS

The present invention together with the above and other objects and advantages may best be understood from the following detailed description of the preferred embodiments of the invention illustrated in the drawings, wherein:

FIGS. 5A and 5B together provide a flow chart illustrating a censoring browser data packet processing and displaying method for internet viewing of the present invention;

FIGS. 8A and 8B are charts respectively illustrating a category structure and a super category structure in accordance with the present invention;

FIGS. 13, 14, 15 and 16 illustrate respective graphical user interface screens for inputting user selected censoring parameters included in a user profile in accordance with the invention.

DETAILED DESCRIPTION OF THE PREFERRED EMBODIMENTS

Figure 1:
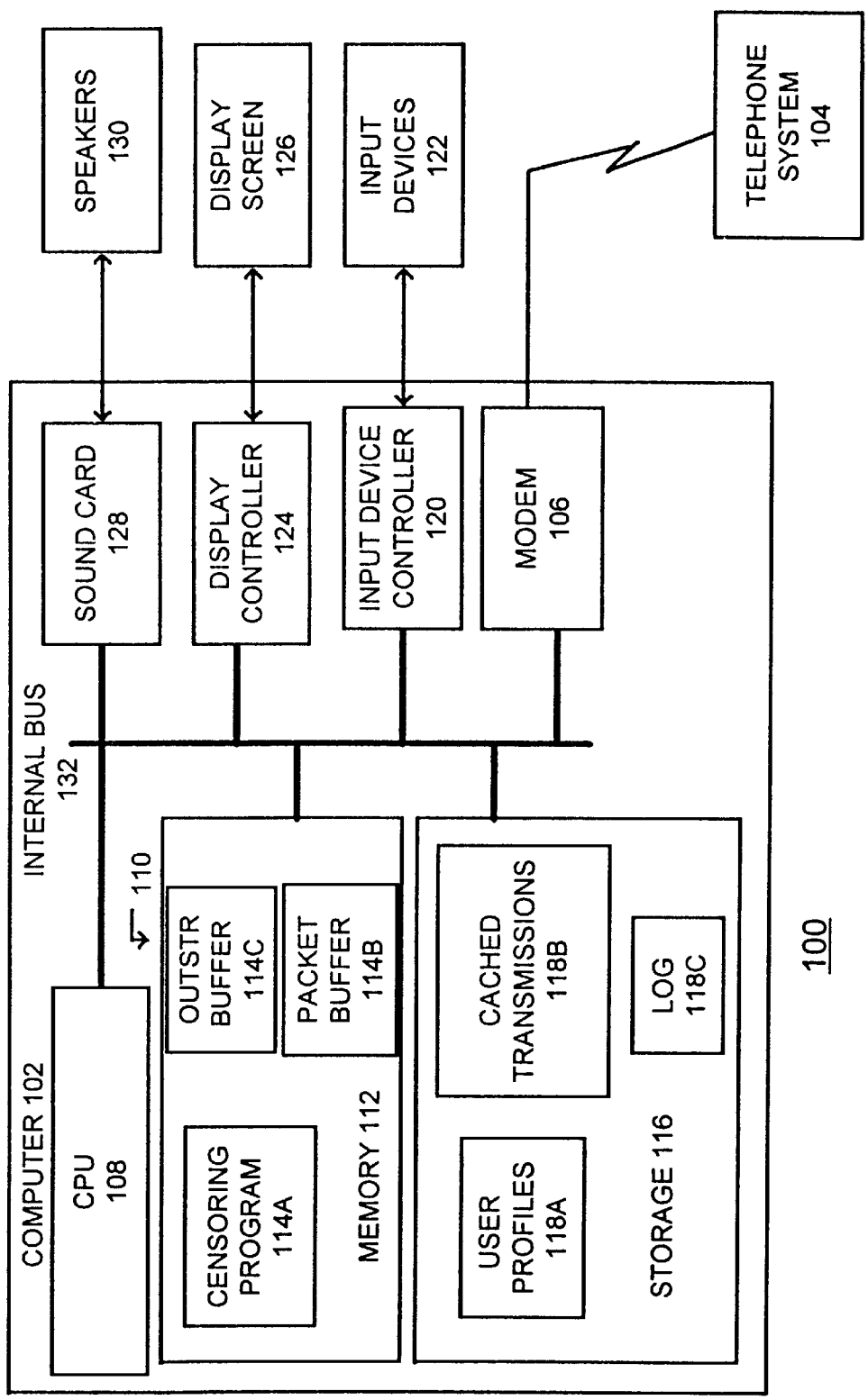
FIG. 1 is a block diagram representation illustrating a computer system for implementing a censoring browser method and apparatus for internet viewing in accordance with the invention.

Having reference now to the drawings, in FIG. 1 there is shown is a block diagram representation illustrating a computer system generally designated by 100 for performing a censoring browser method for internet viewing in accordance with the invention. Computer system 100 includes a computer 102 connected to a telephone system 104 via an internal modem 106. Computer 102 comprises a central processing unit (CPU) 108, program and data storage generally designated by 110. As illustrated, program and data storage 110 includes a memory 112 for storing a censoring browser program 114A, a packet buffer 114B, and an OUTSTR buffer 114C, and a storage 116 for storing user defined profiles 118A, cached transmissions 118B, and a log 118C. Computer 102 includes an input device controller 120 operatively coupled to input devices 122, a display controller 124 operatively coupled to a display screen 126 and a sound card 128 operatively coupled to speakers 130. An internal bus 132 facilitates communications among the components of computer 102. Various commercially available computers can be used for computer 102 in the computer system 100, for example, an IBM personal computer. It should be understood that other alternative embodiments including local area network (LAN) arrangements are possible and fall within the spirit and scope of the invention.

In accordance with the present invention, a censoring browser method and apparatus for internet viewing are provided which, before any text is displayed, searches for and marks any words and words containing any word fragments on a user-defined unwanted-word list stored in a user profile. Then the marked censored words are removed and replaced by user selected substitutes for display of the processed text in accordance with user selected censoring rules stored in a user profile. Each user profile 118A includes a profile record 600 of FIG. 6, a plurality of censored word list records 700 of FIG. 7, a category structure 800 of FIG. 8A, and a super category structure 802 of FIG. 8B.

Figure 2:
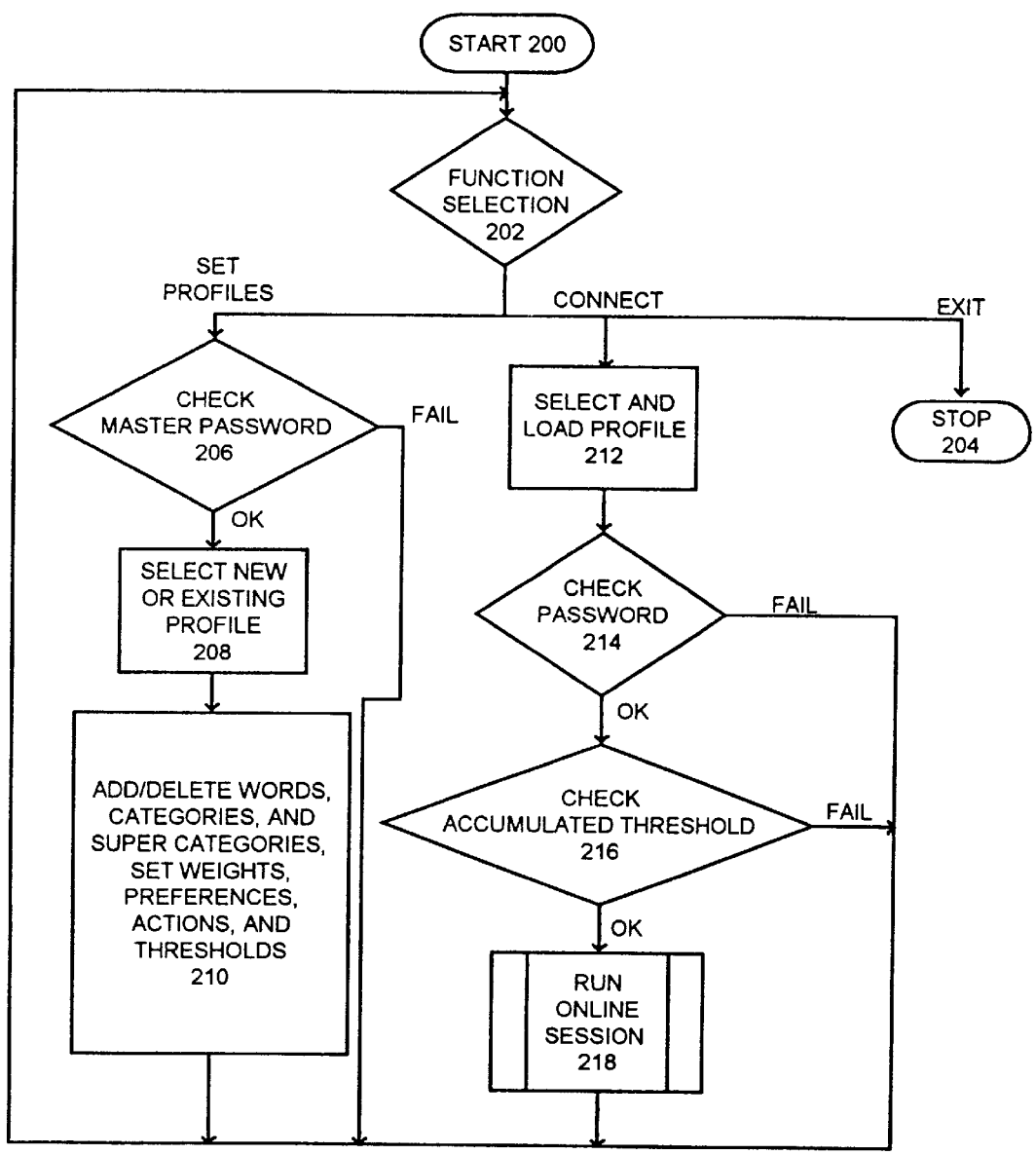
FIG. 2 is a flow chart illustrating a censoring browser main process for internet viewing of the present invention.

Referring now to FIG. 2, a censoring browser main process performed by CPU 108 for internet viewing in accordance with the present invention is illustrated. The sequential steps starting at a block 200 begin with a user function selection as indicated at a block 202 and end at a block 204 with a user exit selection. Responsive to a set profiles user selection, a user entered password is compared with a master password as indicated at a decision block 206. When editing of the user profile is not allowed for the user entered password, then the sequential operations return to block 202 to receive a user function selection. If user profile editing is allowed for the user entered password, a new or existing profile is selected as indicated at a block 208. Then the selected user profile is edited responsive to user selections to add and/or delete word and word fragments, to add and/or delete categories, to add and/or delete super categories, to set weights, to set preferences, to set actions and to set thresholds as indicated at a block 210. Then the sequential operations return to block 202 to receive a user function selection.

Responsive to a connect user selection, a user profile is selected and loaded as indicated at a block 212. A user password is checked as indicated at a decision block 214. If the user password fails, then the sequential operations return to block 202 to receive a user function selection. Otherwise if the user password is accepted, then an accumulated threshold is checked as indicated at a decision block 216. If the accumulated threshold fails, then the sequential operations return to block 202 with the user function selection. Otherwise, if the accumulated threshold is acceptable, a run online session routine illustrated and described with respect to FIG. 3 is performed as indicated by a block 218.

Figure 3:
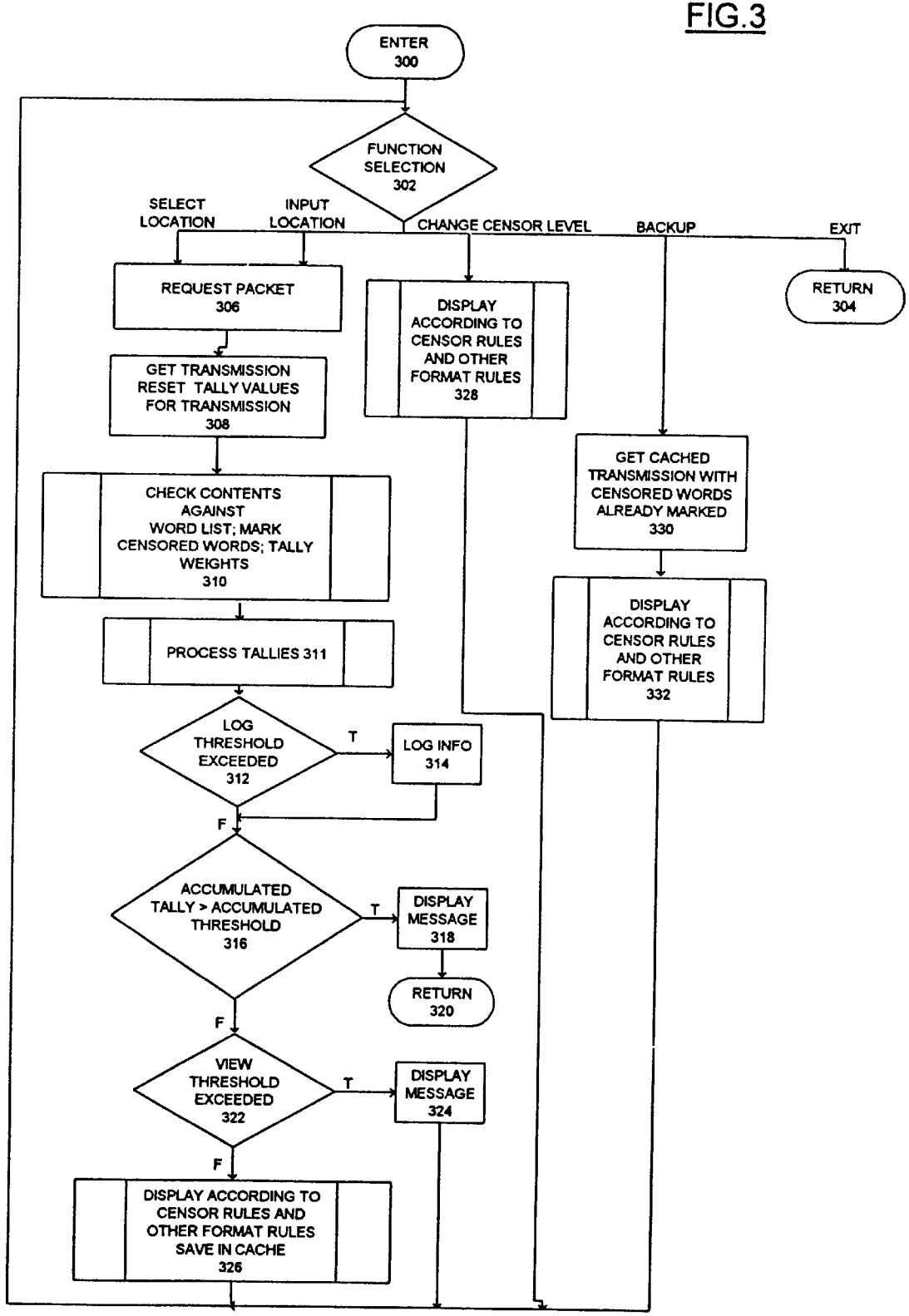
FIG. 3 is a flow chart illustrating a censoring browser run online session process for internet viewing of the present invention.

Referring now to FIG. 3, sequential steps performed by CPU 108 for a censoring browser online session for internet viewing of the present invention are shown. The sequential steps starting at a block 300 begin with a user function selection as indicated at a decision block 302 and return as indicated at a block 304 with a user exit selection. Responsive to a user selection of either a select location or an input location, a internet data packet is requested as indicated at a block 306. The internet data packet transmission is received and transmission tally values are reset to initial values as indicated at a block 308. Next a routine illustrated and described with respect to FIG. 4, to check the contents of the data packet against a user selected censored word list, to mark censored words, and to tally weights is performed as indicated by a block 310. Then a process tallies routine illustrated and described with respect to FIG. 10 is performed as indicated at a block 311. Multiple predetermined tallies are accumulated that are used to differentiate between censoring actions based on the user profile, accumulated buildup, and weighted word values.

Next as indicated at a decision block 312, it is determined whether a log threshold is exceeded. If the log threshold is exceeded, then current information with transmission statistics is stored as indicated at a block 314 as illustrated and described with respect to FIG. 11. When the log threshold is not exceeded or after the information is logged at block 314, then an accumulated tally is compared with an accumulated threshold value as indicated at a decision block 316. If the accumulated threshold value is exceeded, then a message is displayed as indicated at a block 318 and the sequential operations return as indicated at a block 320 to function selection at block 202 in FIG. 2 without displaying the current data packet contents. When a user passes the particular accumulated threshold for that user, the user is done with the session until someone with a master password resets the accumulated tally. The user is effectively stopped from running another online session by the accumulated threshold checking at block 216. If the accumulated threshold is not exceeded, then a view threshold flag is checked as indicated at a decision block 322. If the view threshold is exceeded, then a message is displayed as indicated at a block 324 and the sequential operations return to function selection at block 302 without displaying the current data packet contents. Other actions can be performed with displaying the messages at blocks 318 and 324, such as adding the selected location to a lockout list and storing a message for parents or an employee's supervisor. Otherwise, when the view threshold value is not exceeded, then a display routine is performed for processing the current data packet contents according to the censoring rules and other format rules and the current data packet contents is saved in cache as indicated at a block 326. The packet processing and display method of block 326 is illustrated and described with respect to FIG. 5.

Multiple different levels of censorship can be selected by the user and the data packet is processed and displayed according to the user selected censor level. Responsive to a change censor level user selection at function selection block 302, the current data packet contents are processed and displayed according to the changed selection censoring rules and other format rules as indicated at a block 328 as illustrated and described with respect to FIG. 5. This enables users, if their profiles allow, to change the selected censor level and redisplay the transmission. For example, the user may choose to switch from all *'s to revealing the first letter of censored words. Responsive to a backup user selection at function selection block 302, the cached transmission data packet contents with censored words already marked are loaded as indicated at a block 330 and displayed according to the censoring rules and other format rules as indicated at a block 332 as illustrated and described with respect to FIG. 5.

Figure 4:
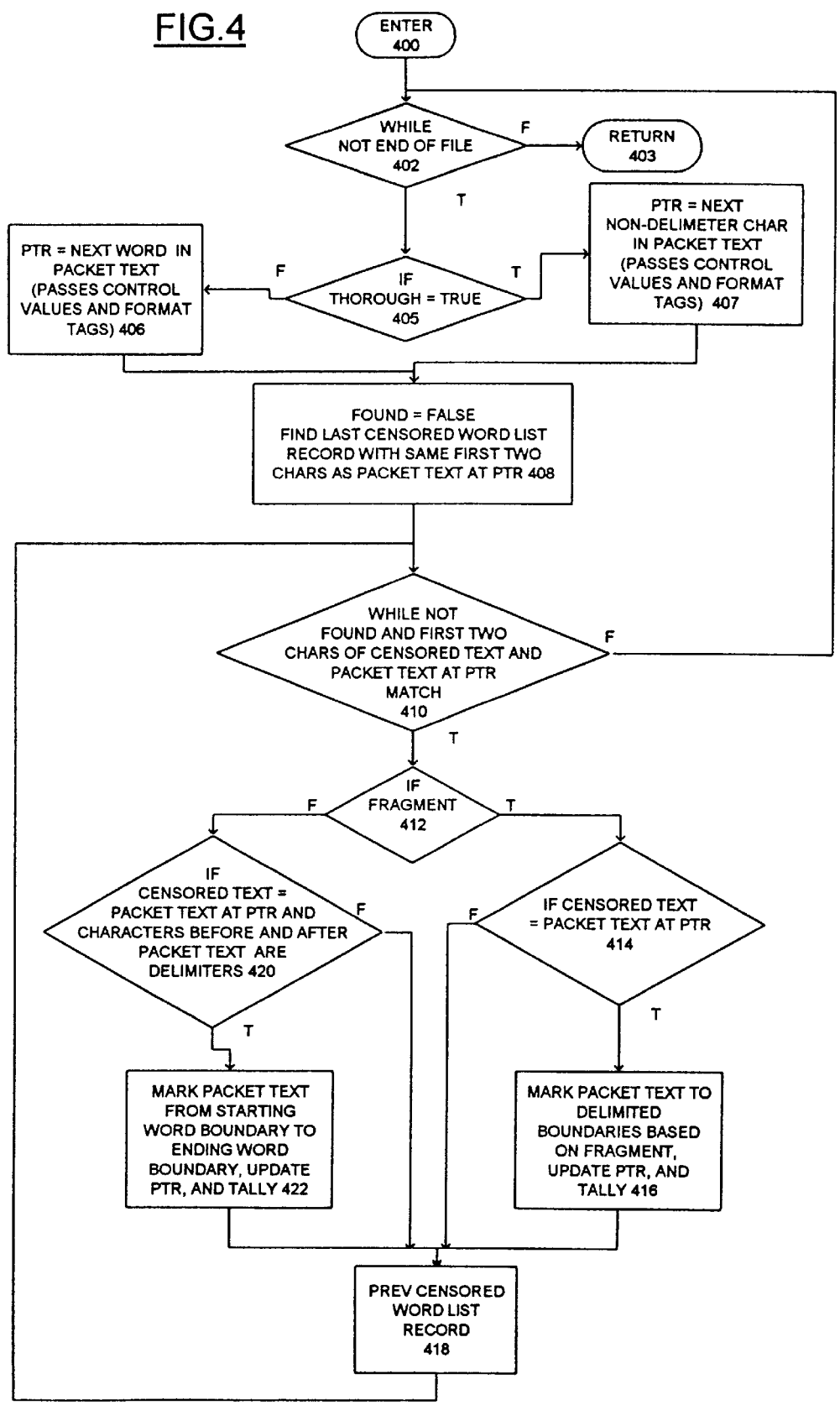
FIG. 4 is a flow chart illustrating a censoring browser check contents, mark, and tally process for internet viewing of the present invention.

Referring to FIG. 4, sequential steps of a censoring browser check contents, mark, and tally process of the present invention are shown. The censoring browser check contents, mark, and tally process is entered at a block 400 with checking for the end of the file of the current data packet as indicated at a decision block 402. When the end of the file is identified at block 402, then the sequential operations return as indicated at a block 403 to block 311 in FIG. 3 to process the tallies.

Otherwise, while not at the end of the file, checking whether a thorough user selection is true is provided as indicated at a decision block 405. The thorough user selection is true for character-by-character checking for finding a user selected word fragment. When the thorough user selection is false, a pointer is set to the next word start in the packet text as indicated at a block 406. When the thorough user selection is true, a pointer is set to next non-delimiter character in the packet text as indicated at a block 407.

Then found is set to false and finding a last censored word list record with the same first two characters of packet text at the pointer is performed as indicated at a block 408. While not found and first two characters of packet text at the pointer match is true as indicated at a decision block 410, then checking is performed to determine whether the censored text from the current censored word list record is a fragment, that is, if flag 704 is equal to zero, as indicated at a decision block 412. If the current censored word list record is a fragment, then checking is performed to determine whether the entire fragment is found at the pointer as indicated at a decision block 414. The check at block 414 is not case sensitive.

If the entire fragment is found at block 414, then marking to delimited boundaries based on the word fragment, updating the pointer, and adding to the tally is performed as indicated at a block 416. The marking to delimited boundaries finds the beginning and the ending of the word or words in the packet text which contain the fragment. For example, if "fur fly" was the fragment, then "fur flying" would be matched and the entire text from the first "f" to the last "g" is marked. Similarly, the fragment "elk" would match the slang "mooselks" and the entire packet text from the "m" to the last "s" is marked. Then a previous word list record is processed as indicated at a block 418.

Otherwise, when the current censored word list record is not a fragment, then checking is performed to determine if the censored text is the same as the packet text at the pointer and that the characters before and after packet text for the length of the censored text are delimiters as indicated at a decision block 420. The check at block 420 is not case-sensitive. If false, then a previous word list record is processed as indicated at a block 418. When true that the censored text is the same as the packet text at the pointer and that the characters before and after the packet text for the length of the censored text are delimiters, then the packet text is marked from the starting word boundary to the ending word boundary, the pointer is updated, and the tally is updated, as indicated at a block 422. Then a previous word list record is processed as indicated at a block 418. As processing continues in block 410 if either found is TRUE or set, as explained with respect to FIG. 9, or if the first two characters of the censored text in the current censored word list record and packet text at the pointer no longer match, then process flow continues to block 402.

Referring to FIGS. 5SA and 5B, sequential steps for data packet processing and display functions process for internet viewing of the present invention are shown. The data packet processing and display functions process is entered at a block 500 with checking for the end of the file as indicated at a decision block 502. When at the end of the file, then the entire OUTSTR buffer 114C is processed for display using standard methods as indicated at a block 504 and the sequential operations return as indicated at a block 506 with checking for a next function selection at block 302 in FIG. 3.

Otherwise, while not at the end of the file, then finding a next delimited component is performed as indicated at a block 508. Then checking for a censor mark is provided as indicated at a decision block 510. If the delimited component is a censor mark at decision block 510, then checking for a level equal to default is provided as indicated at a decision block 512. If the user selected censor level equal to default is true, then process is set to category default censor level as indicated at a block 514. Otherwise, if level equal to default is false, the process is set to the current user selected level as indicated at a block 516.

The removal and substitution censoring function includes a variable number of options, for example, as shown. First, if process equals substitution is true at a decision block 518 and a substitute exists is true at a decision block 520, then the marked unwanted word is replaced with a socially acceptable substitute at a block 522. Otherwise, when a substitute exists is false at decision block 520, then processing is set to the missing substitute censor level for the category at a block 524.

Figure 5B:
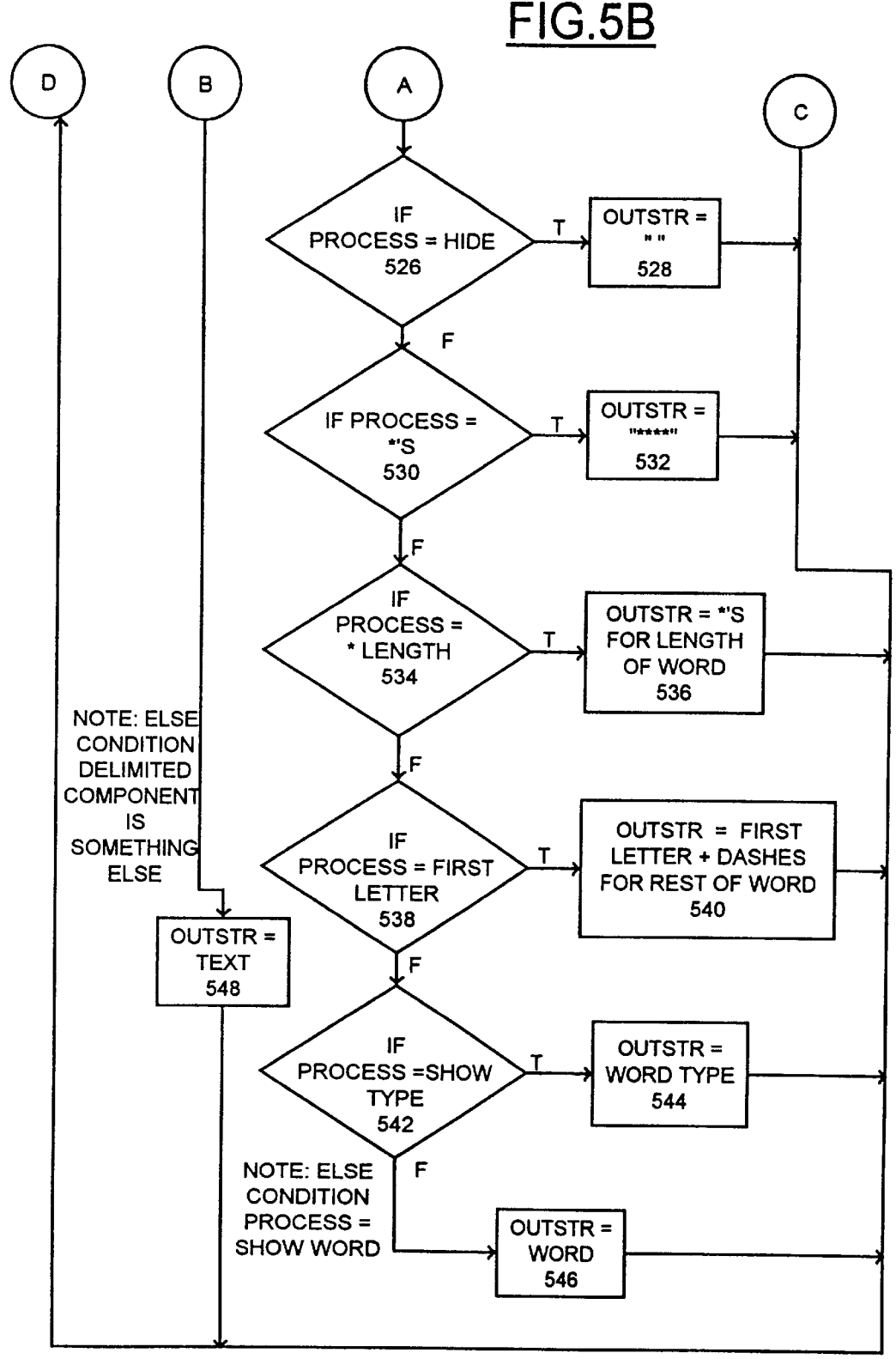

Referring to FIG. 5B, if process equals substitution is false at decision block 518, checking whether process equals hide is true is provided at a decision block 526. If process equals hide is true at decision block 526, then an empty string is outputted for the unwanted word or word fragment as indicated at a block 528 so that the removal of the unwanted word or word fragment is removed from the displayed text. If process equals hide is false at decision block 526, checking whether process equals a set number of asterisks is true is provided at a decision block 530 for replacing the word or fragment with asterisks to indicate that a word has been blanked out. If process equals the set number of asterisks is true at decision block 530, then a fixed string of asterisks is outputted for the unwanted word or word fragment as indicated at a block 532. If process equals the set number of asterisks is false at decision block 530, it is determined whether process equals a variable number of asterisks corresponding to the unwanted word length is true at a decision block 534. If process equals the variable number of asterisks is true at decision block 534, then a string of asterisks corresponding in length to the length of the marked packet text is outputted for the marked packet text as indicated at a block 536. If process equals the variable number of asterisks is false at decision block 534, checking whether process equals first letter is true is provided at a decision block 538. If process equals first letter is true at decision block 538, then a first letter of the unwanted word marked text is outputted followed by a string of dashes corresponding to the length of the rest of the unwanted word marked text as indicated at a block 540. If process equals first letter is false at decision block 538, checking whether process equals show type is true is provided at a decision block 542. If process equals show type is true at decision block 542, then a word type is outputted for the marked text as indicated at a block 544. If process equals show type is false at decision block 542, an else condition process is provided and the marked text is outputted as indicated at a block 546. Then the sequential operations return to block 502 with checking for the end of file.

Referring again to FIG. 5A, if the delimited component is not a censor mark at decision block 510, then an else condition process is provided where the delimited component is something else and text found in block 508 is outputted as indicated at a block 548 in FIG. 5B. Then the sequential operations return to block 502 with checking for the end of file.

Having reference to FIGS. 6, 7, 8A, 8B, 13, 14, 15 and 16, operation of the present invention may be understood with respect to an example of socially offensive words represented by certain animals, foods, animal references, and food references. FIGS. 13, 14, 15 and 16 illustrate respective graphical user interface screens designated by 1300, 1400, 1500 and 1600 for receiving user selections, including predefined user selected censoring parameters included within a user profile 600 illustrated in FIG. 6.

Figure 6:
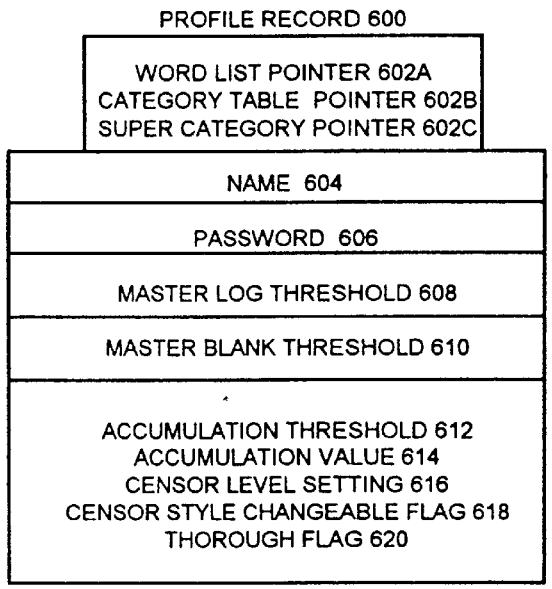
FIG. 6 is a block diagram illustrating a user profile record structure in accordance with the present invention.
Figure 13:
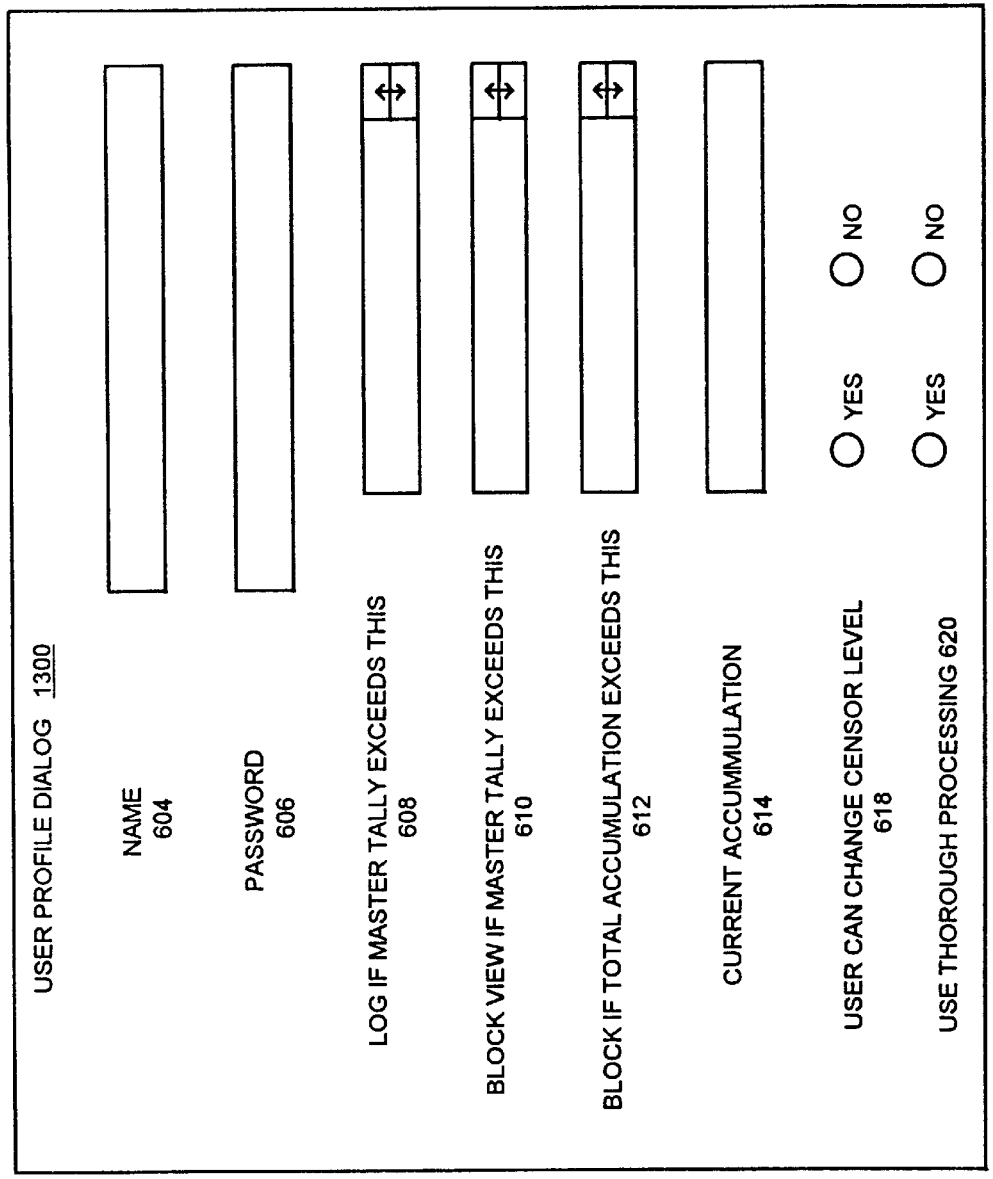

Referring initially to FIG. 6, an exemplary user profile record structure 600 is illustrated in accordance with the present invention. Referring also to FIG. 13, the illustrated user profile dialog 1300 is provided to receive user selections. The profile record structure 600 includes predetermined fields defining a word list pointer 602A, a category table pointer 602B, a super category pointer 602C, a name 604, a password 606, a master log threshold 608, a master blank threshold 610, an accumulation threshold 612, an accumulation value 614, a censor level setting 616, a censor style changeable flag 618, and a thorough flag 620. The censor style changeable flag 618 is set to eliminate user adjustment of the censor level while running a session, for example, with a user profile setup for a child.

Figure 7:
FIG. 7 is a block diagram illustrating a user selected censored word list record structure in accordance with the present invention.

Referring to FIG. 7, an exemplary word list record structure 700 in accordance with the present invention is shown. Referring also to FIG. 14, the illustrated manage word list dialog 1400 is provided to receive user selections. The word list record structure includes a text field 702, a flag field 704, a category field 706, a weight change 708 , and a replacement word pointer 710 to a replacement word 712 which is the word to be substituted for the unwanted word. The text field 702 comprises the unwanted word or word fragment to be censored. The flag field 704 indicates whether the word list record defines a word or a word fragment, where a word fragment is represented by zero and a word is represented by one. The category field 706 comprises an integer index value to the category table index of FIG. 8A. For example, having reference also to FIG. 8A, the category field 706 being set to 2 indicates animal slang, while the category field 706 being set to 5 indicates food slang.

FIGS. 8A and 8B are charts respectively illustrating a category structure 800 and a super category structure 802 in accordance with the present invention. Referring also to FIGS. 15 and 16, the illustrated manage category list dialog 1500 and manage super categories dialog 1600 are provided to receive user selections. The category table structure 800 includes multiple category records where each category record includes an index 804, a super category 806, a name 808, a base weight 810, a tally only with context indicator 812, a default censor level 814, a current tally 816, and a missing substitute censor level 818. The default censor level 814 is set to an integer value of 0–7, where 0 represents a context word that is tallied only and not marked, 1 represents mark, do not censor, 2 represents show type, 3 represents first letter, 4 represents * length, 5 represents 4*, 6 represents hide, and 7 represents substitute if available. The missing substitute censor level 814 is set to an integer value of 0–6, for processing when determined that the substitute does not exist at block 520 in FIG. 5A. The super category table structure 802 includes multiple super category records where each super category record includes an index 806, a super category 820, a context threshold 822, a log threshold 824, a view threshold 826, a context tally 828, a regular tally 830 and a super tally 832.

Figure 9:
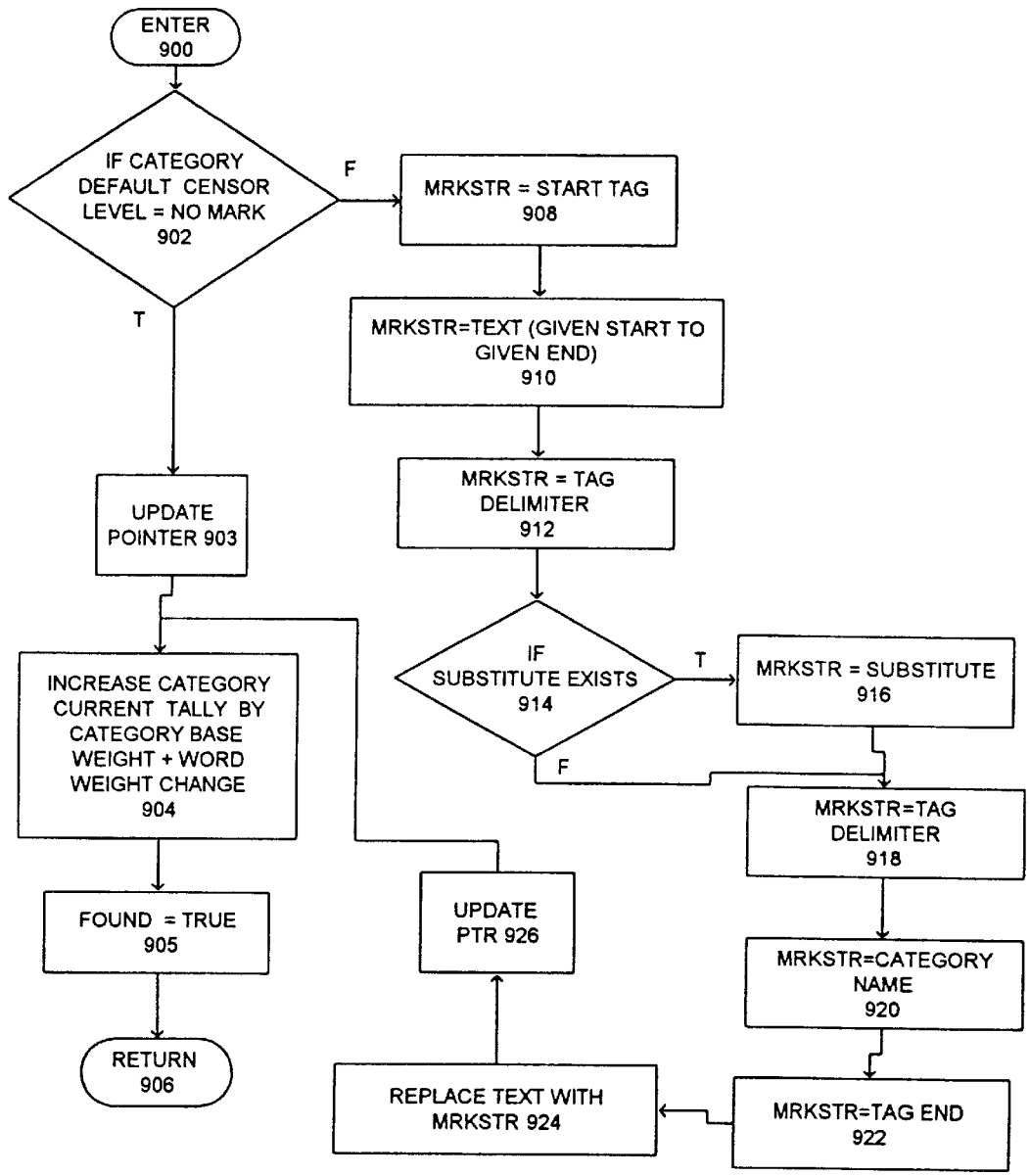
FIG. 9 is a flow chart illustrating a censoring browser process to mark delimited word and add weights for internet viewing of the present invention.

Referring to FIG. 9, sequential steps to mark censored or delimited words and to tally or add weights for internet viewing of the present invention are shown. The mark delimited word and add weights process is entered at a block 900 with the starting and ending position to mark given by the calling process from blocks 422 and 416 in FIG. 4. The sequential steps begin with checking if the category default censor level equals no mark is true as indicated at a decision block 902. If the category default censor level equals no mark is true, then the pointer is updated to the end of the word as indicated at a block 903. Then the category current tally is increased by the category base weight 810 plus any word weight change 708 as indicated at a block 904. Next found is set to true as indicated at a block 905. Then the sequential operation returns as indicated at a block 906 to routine block 418 in FIG. 4 to get the previous word list record. If the category default censor level is not no mark, then a mark is built. A start tag is put into a holding string MRKSTR as indicated at a block 908. Then packet text from the given start to the given end is added to the MRKSTR as indicated at a block 910 for handing partial fragments, words, and word combinations. Next a tag delimiter is added to MRKSTR as indicated at a block 912. Then checking if substitute exists is provided as indicated at a decision block 916. If substitute exists is true, a substitute word is added to MRKSTR, as indicated at a block 918. If substitute exists is false or after the substitute is added to MRKSTR, a tag delimiter is added to MRKSTR as indicated at a block 918.

Next, category name, or information about the censored word, is added to MRKSTR as indicated at a block 920. Next, a tag end is added to MRKSTR as indicated at a block 922. Next the text from given start to given end is replaced with the contents of MRKSTR as indicated at a block 924. Then the pointer is updated to the end of the mark as indicated at a block 926. Then the category tally is increased at block 904 and found is set to true at block 905. Then the sequential operations return to routine block 418 in FIG. 4 to get a previous word list record.

Figure 10A:
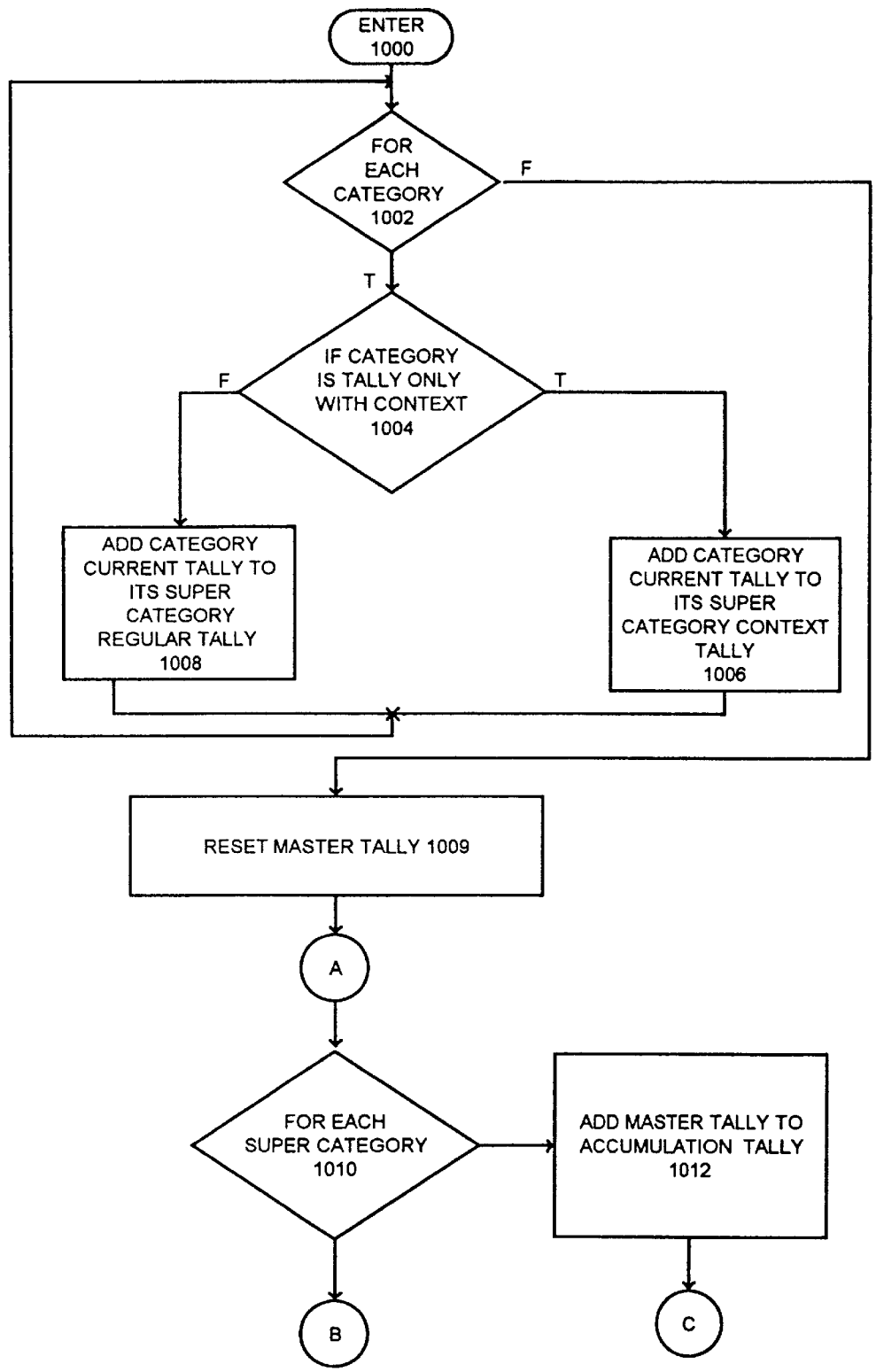
FIGS. 10A, 10B, and 10C together provide a flow chart illustrating a censoring browser method for processing tallies for internet viewing of the present invention.
Figure 10B:
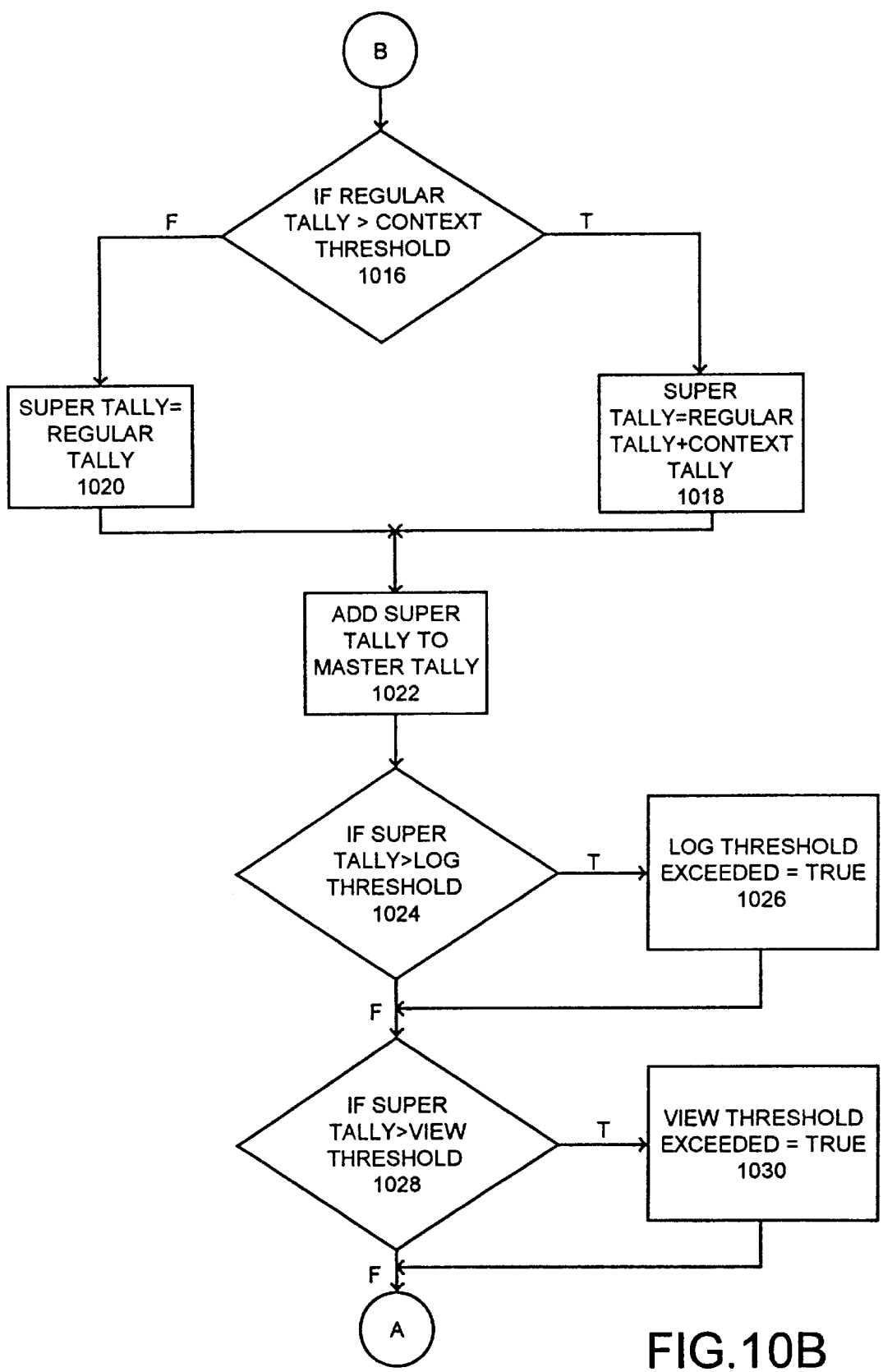
Figure 10C:
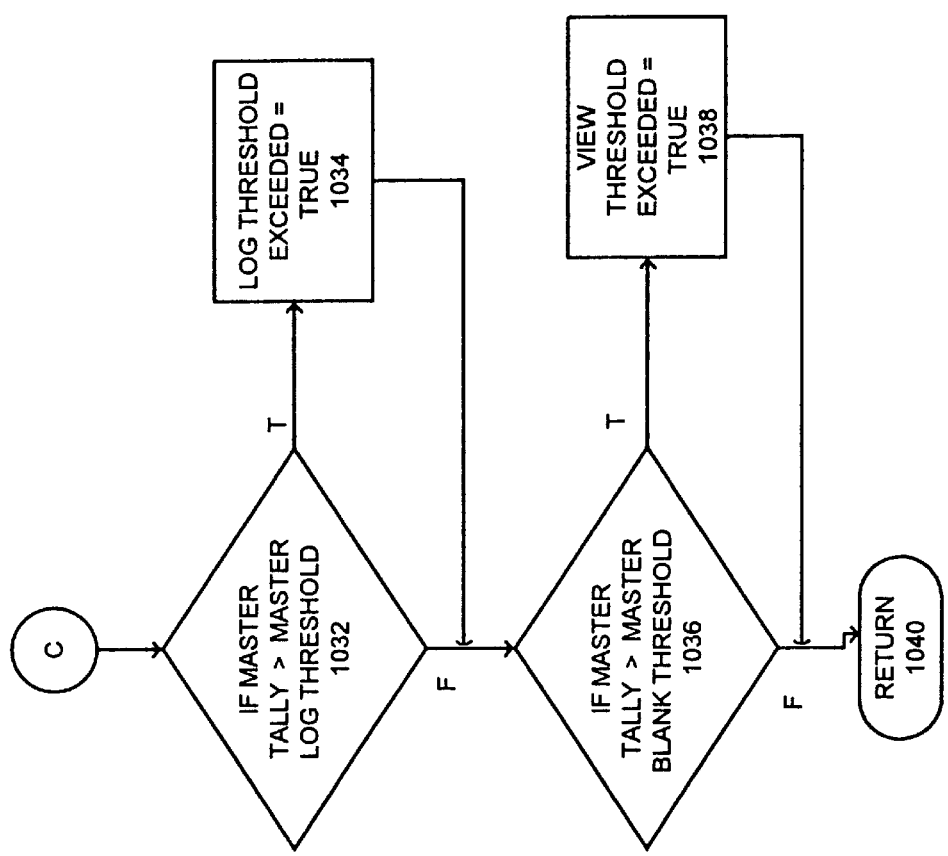

Referring to FIGS. 10A, 10B, and 10C, sequential steps for processing tallies of the present invention are shown. The processing tallies routine is entered at a block 1000 and begins with an iterative loop for each tally category performed as indicated at a decision block 1002. For each tally category, checking if tally category only with context is true is performed as indicated at a decision block 1004. If tally category only with context is true, the category current tally is added to the super category context tally as indicated at a block 1006. If tally category only with context is false, the category current tally is added to the category super category regular tally as indicated at a block 1008. Then the sequential operations return to block 1002 to process the next category. Once all categories have been processed, the master tally is reset as indicated at a block 1009. Then an iterative loop for each super category is performed as indicated at a decision block 1010. Once all super categories have been processed, the master tally is added to the accumulation tally as indicated at a block 1012. Otherwise for each super tally, the regular tally is checked to see if it is greater than the context threshold as indicated at a decision block 1016 in FIG. 10B. If the regular tally is greater than the context threshold, the super tally for the super category is calculated by adding the regular tally and the context tally as indicated at a block 1018. If the regular tally is not greater than the context threshold, the super tally is set equal to the regular tally as indicated at a block 1020. Then the super tally for the super category being processed is added to the master tally as indicated at a block 1022. Next the super tally for the current super category is compared with the user selected log threshold 824 as indicated at a decision block 1024. If the super tally is greater than the user selected log threshold, the log threshold exceeded indicator is set to true as indicated at a block 1026. After the log threshold exceeded indicator is set or if the super tally is not greater than the user selected log threshold, then the super tally is compared with the user selected view threshold 826 as indicated at a decision block 1028. If the super tally is greater than the user selected view threshold, the view threshold exceeded indicator is set to true as indicated at a block 1030. After the view threshold exceeded indicator is set or if the super tally is not greater than the user selected view threshold, then the sequential operations return to block 1010 to process the next super category.

Referring to FIG. 10C, after the master tally is added to the accumulation tally at block 1012, then checking if the master tally is greater than a master log threshold is true is identified as indicated at a decision block 1032. If the master tally is greater than a master log threshold is true, then the log threshold exceeded indicator is set to true as indicated at a block 1034. Otherwise if the master tally is greater than a master log threshold is false, then checking if the master tally is greater than a master blank threshold is true is identified as indicated at a decision block 1036. If the master tally is greater than a master blank threshold is true, then the view threshold exceeded indicator is set to true as indicated at a block 1038. If the master tally is greater than the master blank threshold is false or after the view threshold exceeded indicator is set to true at block 1038, then the sequential operations return as indicated at a block 1040 to routine block 312 in FIG. 3 to check for log threshold exceeded.

Figure 11:
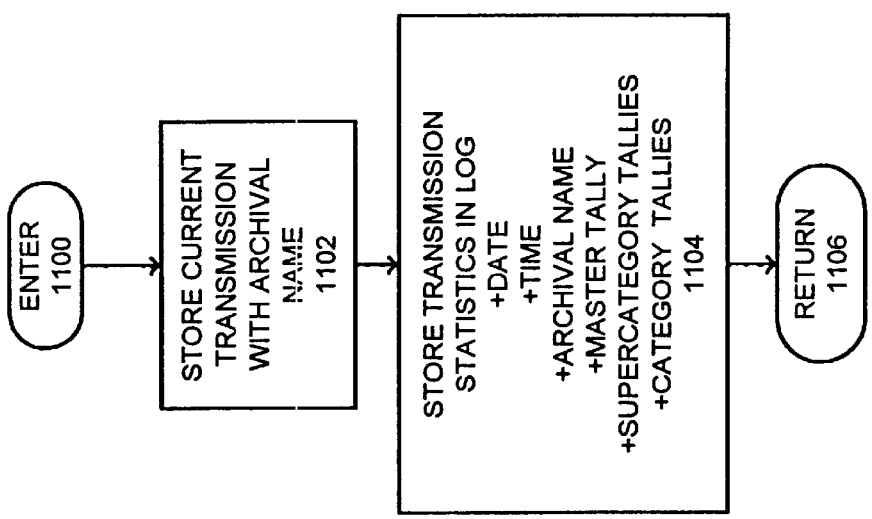
FIG. 11 is a flow chart illustrating a censoring browser process to log data in accordance with the present invention.

Referring to FIG. 11, sequential steps for log data processing of the present invention are shown. The log data process is entered at a block 1100 and begins with storing the current transmission data packet with an archival name at a block 1102. Transmission statistics including date, time, archival name, master tally, super category tallies and category tallies are stored in the log as indicated at a block 1104. Then the sequential operations return as indicated at a block 1106 for checking the accumulated tally at block 316 in FIG. 3.

Figure 12:
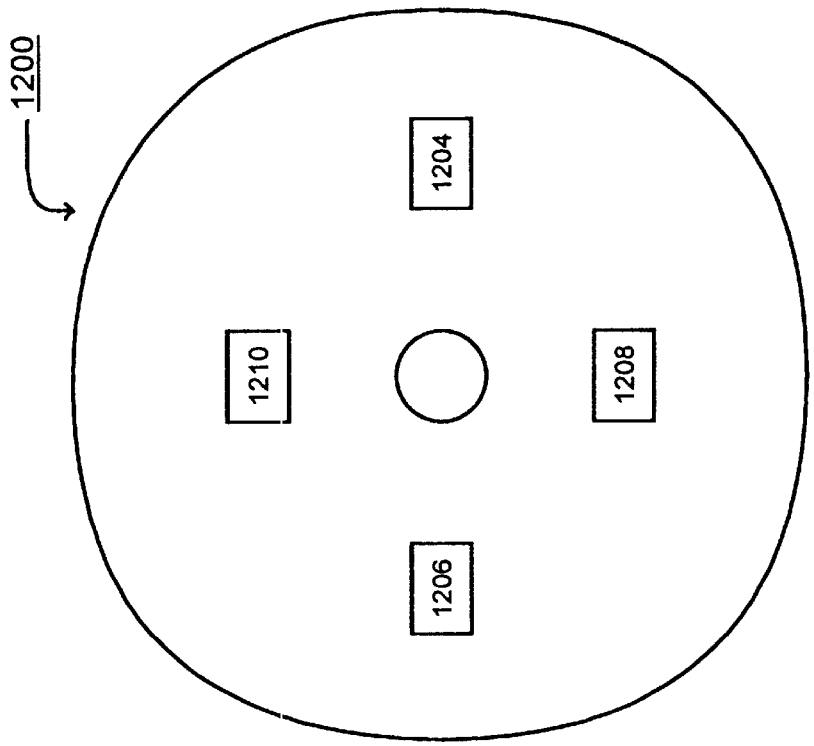
FIG. 12 is a block diagram illustrating a computer program product in accordance with the invention.

Referring now to FIG. 12, an article of manufacture or a computer program product 1200 of the invention is illustrated. The computer program product 1200 includes a recording medium 1202, such as, a floppy disk, a high capacity read only memory in the form of an optically read compact disk or CD-ROM, a tape, a transmission type media such as a digital or analog communications link, or a similar computer program product. Recording medium 1202 stores program means 1204, 1206, 1208, 1210 on the medium 1202 for carrying out the methods of this invention in the system 100 of FIG. 1.

A sequence of program instructions or a logical assembly of one or more interrelated modules defined by the recorded program means 1204, 1206, 1208, 1210, direct the computer systems 100 to perform the censoring browser method for internet viewing of the invention.

While the present invention has been described with reference to the details of the embodiments of the invention shown in the drawing, these details are not intended to limit the scope of the invention as claimed in the appended claims.

What is claimed is:

1. A censoring browser apparatus for internet viewing comprising:

means for storing a user profile, said user profile including user selected censoring parameters;

means for receiving a data packet and for comparing contents of said received data packet with said user selected censoring parameters;

means responsive to said comparing means for processing said received data packet contents;

means for selectively displaying said processed data packet contents responsive to said user selected censoring parameters;

wherein said means for storing said user profile include means receiving and comparing a predefined password with a master password; and means responsive to an identified match and user selections for selecting a user profile and means for editing said selected user profile; wherein said means for editing said selected user profile include means for adding and for deleting user selected words and word fragments, user selected categories, user selected set weights, user selected set preferences, user selected set censoring actions and user selected threshold values.

2. A censoring browser apparatus for internet viewing as recited in claim 1 wherein said means for storing said user profile include means for storing a plurality of user profiles.

3. A censoring browser apparatus for internet viewing as recited in claim 1 further includes means for identifying changed user selected censoring parameters, means for comparing contents of said received data packet with said changed user selected censoring parameters; means responsive to said comparing means for processing said received data packet contents; and means for selectively displaying said processed data packet contents responsive to said changed user selected censoring parameters.

4. A censoring browser apparatus for internet viewing as recited in claim 1 wherein said means for comparing contents of said received data packet with said user selected censoring parameters includes means for identifying user selected embedded words and user selected nonembedded words.

5. A censoring browser apparatus for internet viewing as recited in claim 1 wherein said means for comparing contents of said received data packet with said user selected censoring parameters includes means for identifying user selected context only words.

6. A censoring browser apparatus for internet viewing comprising:

means for storing a user profile, said user profile including user selected censoring parameters;

means for receiving a data packet and for comparing contents of said received data packet with said user selected censoring parameters;

means responsive to said comparing means for processing said received data packet contents;

means for selectively displaying said processed data packet contents responsive to said user selected censoring parameters;

wherein said means for receiving said data packet and for comparing contents of said received data packet with said user selected censoring parameters include means for comparing contents of said received data packet with user selected words and word fragments; and means responsive to said comparing means for marking identified matching words and word fragments; and wherein said means for receiving said data packet and for comparing contents of said received data packet with said user selected censoring parameters include means responsive to said marked identified matching words and word fragments for tallying predefined user selected weights.

7. A censoring browser apparatus for internet viewing as recited in claim 6 wherein said means for receiving said data packet and for comparing contents of said received data packet with said user selected censoring parameters include means for processing tallies for predefined user selected categories; and wherein said means responsive to said comparing means for processing said received data packet contents include means for comparing accumulated tallies with predefined threshold values.

8. A censoring browser apparatus for internet viewing as recited in claim 7 include means responsive to a predefined one of said accumulated tallies exceeding a predefined accumulated threshold value for displaying a message without displaying the received data packet contents.

9. A censoring browser apparatus for internet viewing as recited in claim 7 include means responsive to a predefined one of said accumulated tallies exceeding a predefined log threshold value for logging predefined information.

10. A censoring browser apparatus for internet viewing as recited in claim 6 wherein said means responsive to said comparing means for processing said received data packet contents; and said means for selectively displaying said processed data packet contents responsive to said user selected censoring parameters include means responsive to marked identified matching words and word fragments for identifying a user selected processing level for removing and replacing said marked identified matching words and word fragments.

11. A censoring browser apparatus for internet viewing as recited in claim 10 wherein said means for removing and replacing said marked identified matching words and word fragments include means for identifying a default user selected processing level.

12. A censoring browser apparatus for internet viewing as recited in claim 10 wherein said means for removing and replacing said marked identified matching words and word fragments include means for identifying and outputting a user defined substitute word to be displayed with said processed data packet contents.

13. A censoring browser apparatus for internet viewing as recited in claim 10 wherein said means for removing and replacing said marked identified matching words and word fragments include means for identifying and outputting a user selected substitute character string to be displayed with said processed data packet contents.

14. A censoring browser apparatus for internet viewing as recited in claim 10 wherein said means for removing and replacing said marked identified matching words and word fragments include means for identifying and outputting a user selected word category designation to be displayed with said processed data packet contents.

15. A censoring browser method for internet viewing comprising the steps of:

storing a user profile, said user profile including user selected censoring parameters;

receiving a data packet and comparing contents of said received data packet with said user selected censoring parameters;

processing said received data packet contents responsive to compared matching words and word fragments;

selectively displaying said processed data packet contents responsive to said user selected censoring parameters;

receiving and comparing a predefined password with a master password; and responsive to an identified match, receiving user selections for selecting a stored user profile and for editing said selected user profile; and wherein said step of receiving user selections for editing said selected user profile includes the steps of receiving user selections for adding and for deleting user selected words and word fragments, user selected categories, user selected set weights, user selected set preferences, user selected set censoring actions and user selected threshold values.

16. A censoring browser method for internet viewing as recited in claim 15 wherein said step of selectively displaying said processed data packet contents responsive to said user selected censoring parameters includes the steps of identifying a marked censored word or a marked censored word fragment; identifying a user selected set censoring action; and generating a replacement for said identified marked censored word or marked censored word fragment responsive to said user selected set censoring action.

17. A censoring browser method for internet viewing as recited in claim 15 further includes the steps of marking a censored word or a censored word fragment; accumulating a tally with each said marked censored word and said marked censored word fragment; and comparing said accumulated tally with a predetermined threshold value.

18. A computer program product for use in a computer system comprising:

a recording medium;

means, recorded on the recording medium, for storing a user profile, said user profile including user selected censoring parameters;

means, recorded on the recording medium, for receiving a data packet and for comparing contents of said received data packet with said user selected censoring parameters; including means, recorded on the recording medium, for comparing contents of said received data packet with user selected words and word fragments; means, recorded on the recording medium, responsive to said comparing means for marking identified matching words and word fragments; and means, recorded on the recording medium, responsive to said marked identified matching words and word fragments for tallying predefined user selected weights;

means, recorded on the recording medium, responsive to said comparing means for processing said received data packet contents; and means, recorded on the recording medium, for selectively displaying said processed data packet contents responsive to said user selected censoring parameters.

19. A computer program product for use in a computer system as recited in claim 18 wherein said means, recorded on the recording medium, for selectively displaying said processed data packet contents responsive to said user selected censoring parameters includes means, recorded on the recording medium, for identifying a marked censored word or a marked censored word fragment; for identifying a user selected set censoring action; and for generating a replacement for said identified marked censored word or marked censored word fragment responsive to said user selected set censoring action.

20. A computer program product for use in a computer system as recited in claim 19 further includes means, recorded on the recording medium, for marking a censored word or a censored word fragment; for accumulating a tally with each said marked censored word and said marked censored word fragment; and for comparing said accumulated tally with a predetermined threshold value.

* * * * *